United States Patent [19]

Hasegawa

[11] Patent Number: 4,748,972
[45] Date of Patent: Jun. 7, 1988

[54] VEHICLE SEAT FITTED WITH MASSAGING DEVICE

[76] Inventor: Tsuruso Hasegawa, 1-20, Nishioi 3-chome, Shinagawa-ku, Tokyo, Japan

[21] Appl. No.: 39,434

[22] Filed: Apr. 17, 1987

[30] Foreign Application Priority Data

Apr. 18, 1986 [JP] Japan .................................. 61-89735
Aug. 2, 1986 [JP] Japan ................................ 61-182494
Feb. 18, 1987 [JP] Japan .................................. 62-35230

[51] Int. Cl.⁴ .............................................. A61H 1/00
[52] U.S. Cl. .................................... 128/24 A; 128/33; 128/36
[58] Field of Search .................. 128/24 A, 33, 32, 34, 128/35, 36

[56] References Cited

U.S. PATENT DOCUMENTS

| | | | |
|---|---|---|---|
| 3,037,499 | 6/1962 | Cummins | 128/33 |
| 3,092,100 | 6/1963 | Oetinger | 128/33 |
| 3,234,933 | 2/1966 | Martin | 128/36 |
| 3,455,296 | 7/1969 | McCaleb | 128/33 |
| 3,499,436 | 3/1970 | Balamuth | 128/24 A |
| 3,811,430 | 5/1974 | Kawakami | 128/33 |
| 3,890,963 | 6/1975 | Patterson | 128/33 |
| 4,535,760 | 8/1985 | Ikeda et al. | 128/33 |

Primary Examiner—Edgar S. Burr
Assistant Examiner—Huong Q. Pham
Attorney, Agent, or Firm—Oblon, Fisher, Spivak, McClelland & Maier

[57] ABSTRACT

A vehicle seat fitted with a massaging device capable of exhibiting essential function of a seat without deteriorating an appearance of the seat and performing massaging function at any time for a driver of a car or the like. The vehicle seat includes a suitable massaging device incorporated in a portion of a back supporting section of the seat against which a part of the human body to be massaged is abutted. The massaging device includes a motor arranged in a motor chamber and a coiled spring arranged in a spring chamber and fixed at one end thereof on an inner surface of the spring chamber. The coiled spring includes a coil section wound into a multi-stage shape. When the motor is rotated at a high speed to generate vibration at a high speed, it is transmitted to the coiled spring to generate resonance in the spring, resulting in the coil section of the spring generating vibration at a high speed which mutually complicatedly amplifies to have an ultra-high speed. The so-generated vibration of the ultra-high speed is transmitted to air in the spring chamber to generate an ultrasonic-like wave which is used for massaging of the human body.

8 Claims, 6 Drawing Sheets

VEHICLE SEAT FITTED WITH MASSAGING DEVICE

BACKGROUND OF THE INVENTION

1. Field of the Invention

This invention relates to a vehicle seat fitted with a massaging device, and more particularly to a seat for a vehicle such as a car, a sightseeing bus, a truck or the like of which a portion of a back supporting section against which a part of the human body such as the waist or the like is abutted has at least one suitable massaging device such as a vibrator, a kneader or the like incorporated therein.

2. Description of the Prior Art

A conventional massaging device is generally classified into a manually-operated type and a motor-powered type. However, there has never been developed a motor-powered massaging device which is constructed to utilize an ultrasonic-like wave.

A device for promotion of health which has been conventionally proposed to utilize an ultrasonic wave is constructed to place an ultrasonic generator in a bathtub to cause the human body to take an ultrasonic bath which is a kind of massage. However, there has been failed to provide any device utilizing an ultrasonic-like wave in the air.

SUMMARY OF THE INVENTION

The present invention has been made to provide a novel vehicle seat fitted with a massaging device which has a suitable massaging device incorporated in a portion of a back supporting section of the seat against which a part of the human body to be massaged is abutted.

Accordingly, it is an object of the present invention to provide a vehicle seat fitted with a massaging device which is capable of exhibiting essential function of a seat without deteriorating an appearance of the seat and the like.

It is another object of the present invention to provide a vehicle seat fitted with a massaging device which is capable of permitting its massaging function to be performed at any time for health of a driver.

It is a further object of the present invention to provide a vehicle seat fitted with a massaging device which is capable of curing bodily fatigue and nerve strain of a professional driver of a taxi, a sightseeing bus or the like.

It is still another object of the present invention to provide a vehicle seat fitted with a massaging device which is capable of allowing a passenger of a taxi, a sightseeing bus or the like to be readily subjected to massage at any time as desired.

In accordance with the present invention, there is provided a vehicle seat fitted with a massaging device. The vehicle seat includes a seat section and a back supporting section. Also, the seat includes a massaging device and a mounting structure arranged in the seat to fix the massaging device in the seat.

The massaging device includes a base. The base is provided therein with at least one motor chamber and at least one spring chamber. The device also includes a motor arranged in the motor chamber and a coiled spring arranged in the spring chamber and fixed at one end thereof on an inner surface of the spring chamber. The coiled spring has a coil section wound into a multistage shape. The motor is rotated at a high speed to generate vibration at a high speed, which is then transmitted to the coiled spring to generate resonance in the coiled spring, resulting in the coil section of the coiled spring generating vibration at a high speed which mutually complicatedly amplifies to a degree sufficient to have an ultra-high speed. The vibration of the ultra-high speed is transmitted to air in the spring chamber to generate an ultrasonic-like wave which is used for massaging of the human body.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout, wherein.

DETAILED DESCRIPTION OF THE PREFERRED EMBODIMENTS

Figure 1:
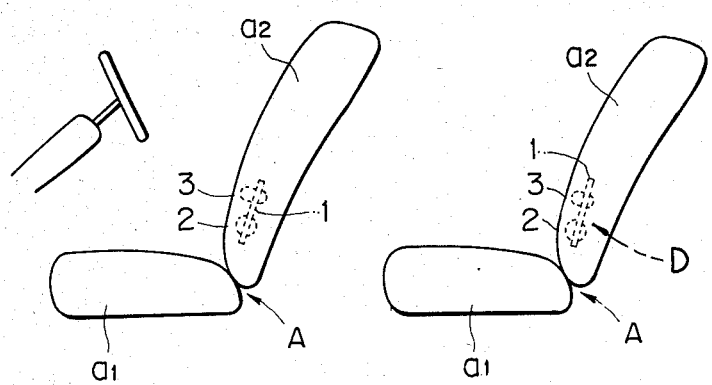
FIG. 1 is a schematic side elevation view showing a first embodiment of a vehicle seat fitted with a massaging device according to the present invention.

Now, a vehicle seat fitted with a massaging device according to the present invention will be described hereinafter with reference to the accompanying drawings.

The First Embodiment

FIGS. 1 to 5 illustrate a first embodiment of a vehicle seat fitted with a massaging device according to the present invention.

A vehicle seat of the illustrated embodiment generally designated by reference character A includes a seat section a1 and a back supporting section a2. The seat section a1 has a working surface which, in use, supports a person, and the back supporting section a2 has a working surface against which, in use, a person rests. The back supporting section a2 has at least one suitable massaging device B such as a vibrator, a kneader or the like arranged in a portion thereof against which a part of the human body to be massaged such as the waist, back, or the like is abutted.

Figure 2A:
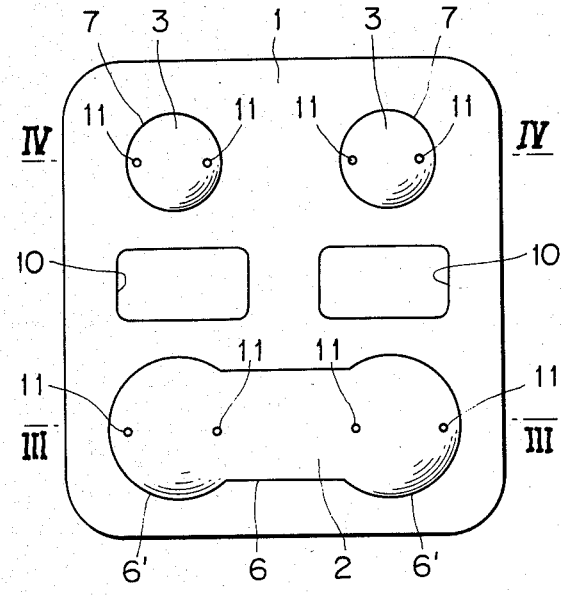
FIG. 2(a) is a front elevation view showing a massaging device incorporated in the vehicle seat of FIG. 1.

In the illustrated embodiment, the massaging device B is constructed in a manner as shown in FIG. 2.

More particularly, the massaging device B includes a base 1 which is provided with at least one hollow motor chamber 2 and at least one hollow spring chamber 3. In the motor chamber 2 and the spring chamber 3 are arranged a motor 4 and a coiled spring 5, respectively. The coiled spring 5 includes a coil section wound into a multistage shape. The coiled spring 5 is fixed at one end thereof on an inner surface of the spring chamber 3. The motor 4 generates vibration at a high speed due to its rotation at high speed in the motor chamber 2. The so-generated vibration is transmitted to the coiled spring 5 in the spring chamber 3 to cause resonance to occur in the coiled spring 5. This causes the multistage coil section of the coiled spring 5 to generate vibration at a high speed, which mutually complicatedly amplifies, so that the vibration may have an ultra-high speed. The so-obtained ultra-high speed vibration is transmitted to air in the spring chamber 3 to generate an ultrasonic-like wave which is effectively used for massage of the human body.

In the illustrated embodiment, the base 1 which is formed with the motor chamber 2 and spring chamber 3 may be formed of a suitable material. For example, it may be formed by molding of a plastic material.

The motor chamber 2 may comprise a section 6 formed into, for example, a hollow cylindrical shape to have a pair of spherical portions 6' arranged in a lateral direction. The base 1 has at least one such hollow section 6. The spring chamber 3 may comprises a hollow section 7 formed into an elliptic shape in section. Alternatively, it may comprise one of the spherical portions 6' of the cylindrical section 6.

The base 1 is formed with through-holes 10, and the hollow cylindrical section 6 and hollow elliptic section 7 each are provided with small through-holes 11.

Figure 4:
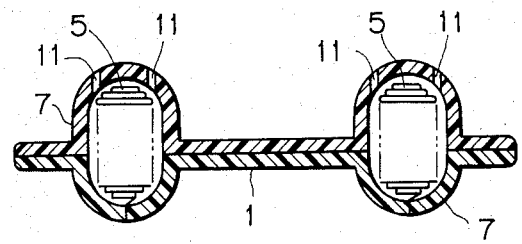
FIG. 4 is a sectional view taken along line IV—IV of FIG. 2(a)
Figure 5:
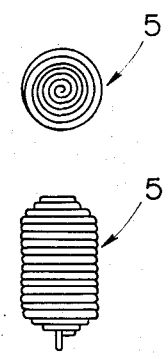
FIG. 5 is a schematic view showing front and top configurations of a coiled spring.

As shown in FIGS. 4 and 5, the coiled spring 5 comprises a single steel wire closely wound. The coiled spring 5 is fixed at a lower end thereof on a bottom surface of the spring chamber 3 to stand up thereon and cause the coil section thereof to be free in the spring chamber 3, so that it may highly readily generate vibration.

Also, the coiled spring 5, as shown in FIG. 4, is arranged in the spring chamber 3 in a manner such that its periphery is in noncontact with a wall of the spring chamber 3.

Figure 3:
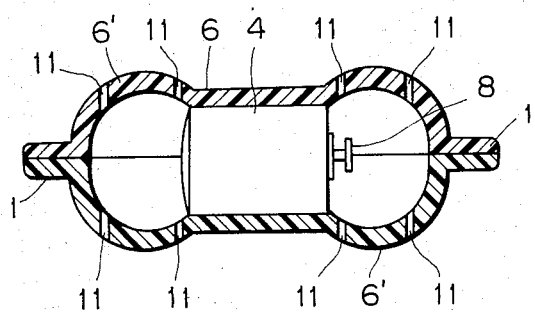
FIG. 3 is a sectional view taken along line III—III of FIG. 2(a)
Figure 2B:
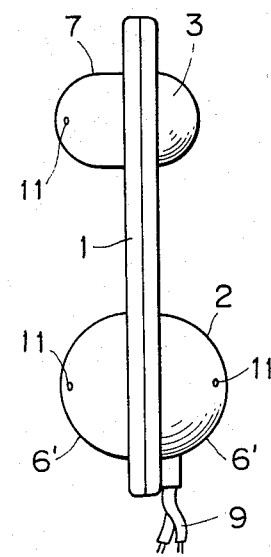
FIG. 2(b) is a right side view of the massaging device shown in FIG. 2(a)
Figure 2C:
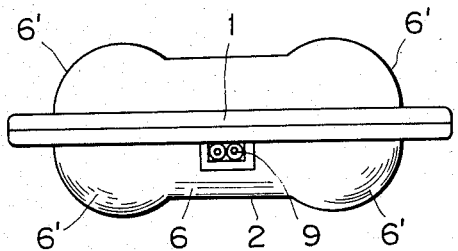
FIG. 2(c) is a bottom view of the massaging device shown in FIG. 2(a)

The motor 4, as shown in FIG. 3, has an eccentric plate 8 mounted on a revolving shaft thereof. Such construction allows vibration to be more effectively generated when the motor is rotated with a high speed. The motor 4 is provided with lead wires 9 as shown in FIGS. 2(b) and 2(c).

Now the manner of operation of the vehicle seat of the illustrated embodiment will be described hereinafter.

When the motor 4 is turned on and rotated at a high speed, it generates vibration at a high speed, which is then transmitted through the base 1 to the spring chamber 3 and further transmitted to the coiled spring 5 in the spring chamber 3, so that resonance may occur in the coiled spring 5.

This results in vibration at a high speed occurring in the coil section of the coiled spring 5 wound into a multistage shape, which then complicatedly mutually amplifies to a degree sufficient to have an ultra-high speed. The so-obtained vibration of the ultra-high speed is transmitted to air in the spring chamber 3 to generate an ultrasonic-like wave which is useful for massage of the human body.

Thus, when any portion of the human body to be massaged such as the waist or the like is abutted against or approached the massaging device B, the ultrasonic-like wave is applied to the portion to have a massage action thereon.

Concurrently, the spherical portions 6' of the hollow cylindrical section 6 constituting the motor chamber 2, the hollow elliptic section 7 constituting the spring chamber 3 and the like are abutted against the human body to practice a finger-pressure treatment thereon. Also, vibration at a high speed due to rotation of the motor has an action similar to a vibrator on the human body.

The so-obtained actions mutually affect one another to bring a synergetic effect, resulting in a massage effect of the illustrated embodiment being highly increased.

The Second Embodiment

Figure 6A:
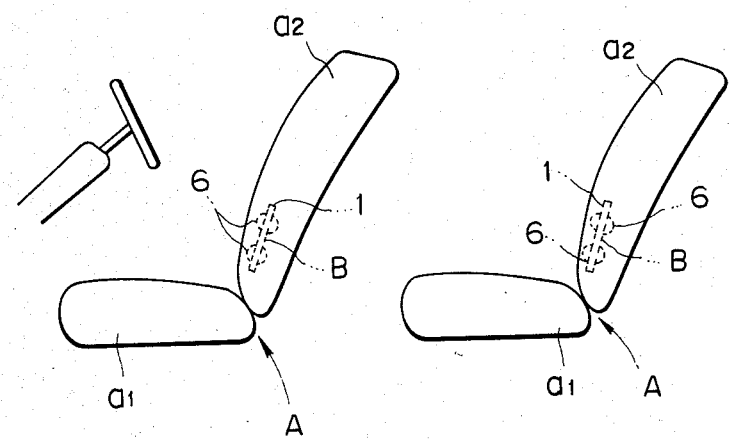
FIG. 6(a) is a schematic side elevation view showing a second embodiment of a vehicle seat fitted with a massaging device according to the present invention.
Figure 6B:
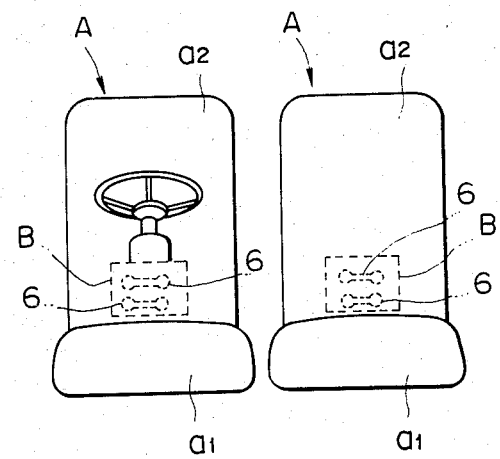
FIG. 6(b) is a schematic front elevation view of the vehicle seat shown in FIG. 6(a)
Figure 7A:
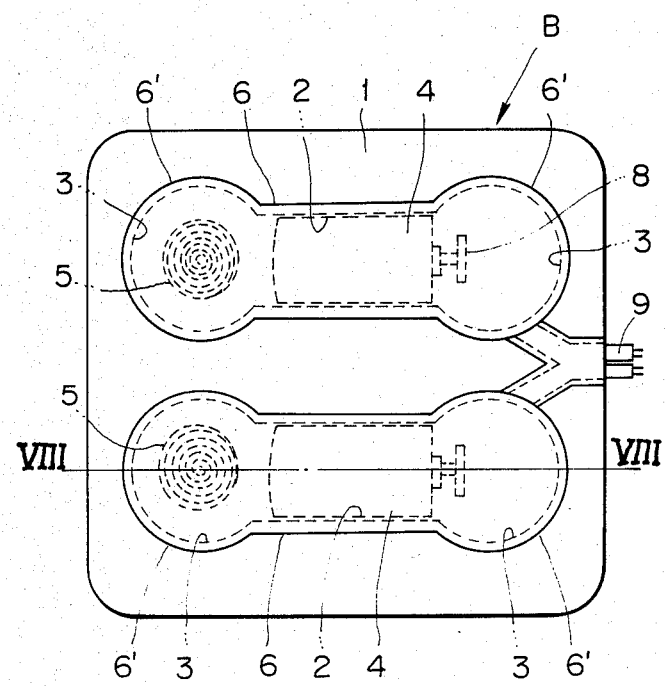
FIG. 7(a) is a front elevation view showing a massaging device incorporated in the vehicle seat shown in FIG. 6(a)
Figure 7B:
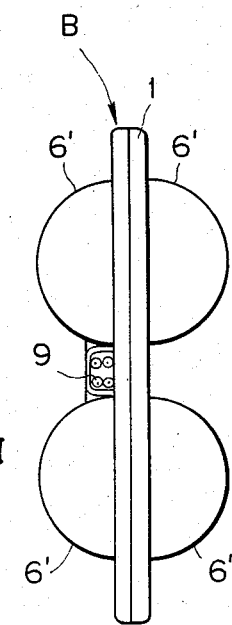
FIG. 7(b) is a right side view of the massaging device shown FIG. 7(a)
Figure 8:
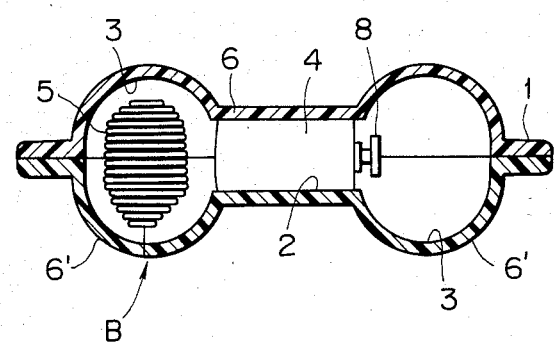
FIG. 8 is a sectional view taken along line VIII—VIII of FIG. 7(a)

FIGS. 6 to 8 show a second embodiment of the present invention.

A massaging device B incorporated in the illustrated embodiment includes a base 1 formed with two hollow cylindrical sections 6. Each of the cylindrical sections 6 has two spherical portions 6' arranged so as to be spaced from each other through a central cylindrical portion in a lateral direction. In the second embodiment, a motor chamber 2 and a spring chamber 3 are defined in each of the hollow cylindrical sections 6. One of the spherical portions 6' of each section 6 is used as the spring chamber. In the motor chamber 2 is arranged a motor 4, and in the spring chamber 3 is arranged a coiled spring 5, which is fixed at one end thereof on an inner surface of the chamber 3. The remaining parts of the second embodiment may be constructed in substantially the same manner as the first embodiment described above.

In the second embodiment constructed as described above, high speed rotation of the motor 4 arranged in the motor chamber 2 of each of the hollow cylindrical sections 6 generates vibration at a high speed, which is then transmitted to the coiled spring 5 arranged in the spring chamber 3 of the cylindrical section 6 to generate resonance in the coiled spring 5. This results in high speed vibration being generated in the coil section of the coiled spring wound into a multistage shape, which then mutually complicatedly amplifies to a degree sufficient to have an ultra-high speed. The vibration is then transmitted to air in each of the spring chambers 3 to generate an ultrasonic-like wave which has a massage action on the human body.

In the illustrated embodiment, two motors 4 are used. Operative adjustment between the motors may be carried out as desired. For example, the motors 4 may be alternately or concurrently actuated. Alternatively, they may be actuated separate from each other using a suitable switch means. Construction and timing for such switching may be determined as desired. For example, starting and stopping of operation of the vehicle seat of the illustrated embodiment may be automatically made in association with a timer. Alternatively, they may be manually switched.

The illustrated embodiment may be so constructed that two or more such motors 4 are used, or the base 1 of the massaging device may be formed with two or more such hollow cylindrical sections 6 in view of a lifetime and a failure of the motor. Such construction permits a service life of the vehicle seat to be significantly lengthened. Such a characteristic is indispensable for a vehicle seat which is required to be used for a long period of time.

It is a matter of course that the amount of output of the massaging device or motor 4 may be suitably adjusted as desired.

Incorporation of the massaging device B in a back supporting section a2 of the vehicle seat is conveniently carried out during manufacturing of the back supporting section a2. However, it may take place after the manufacturing.

The Third Embodiment

Figure 9A:
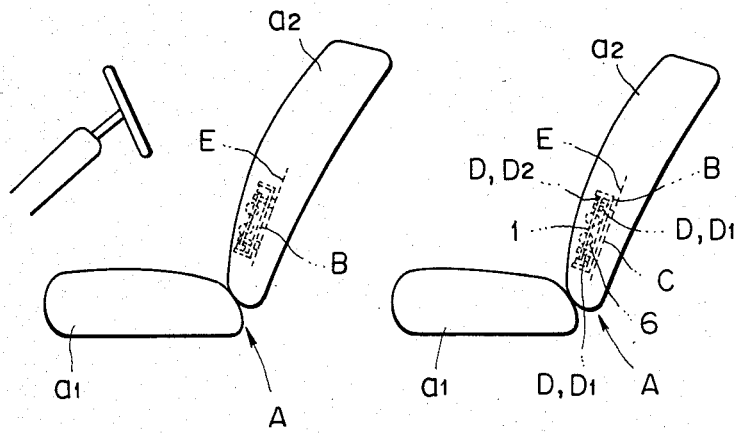
FIG. 9(a) is a schematic side elevation view showing a third embodiment of a vehicle seat fitted with a massaging device according to the present invention.
Figure 9B:
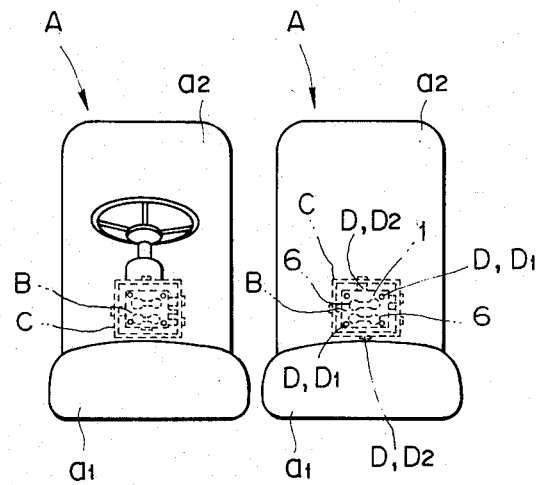
FIG. 9(b) is a schematic front elevation view of the vehicle seat shown in FIG. 9(a)
Figure 10:
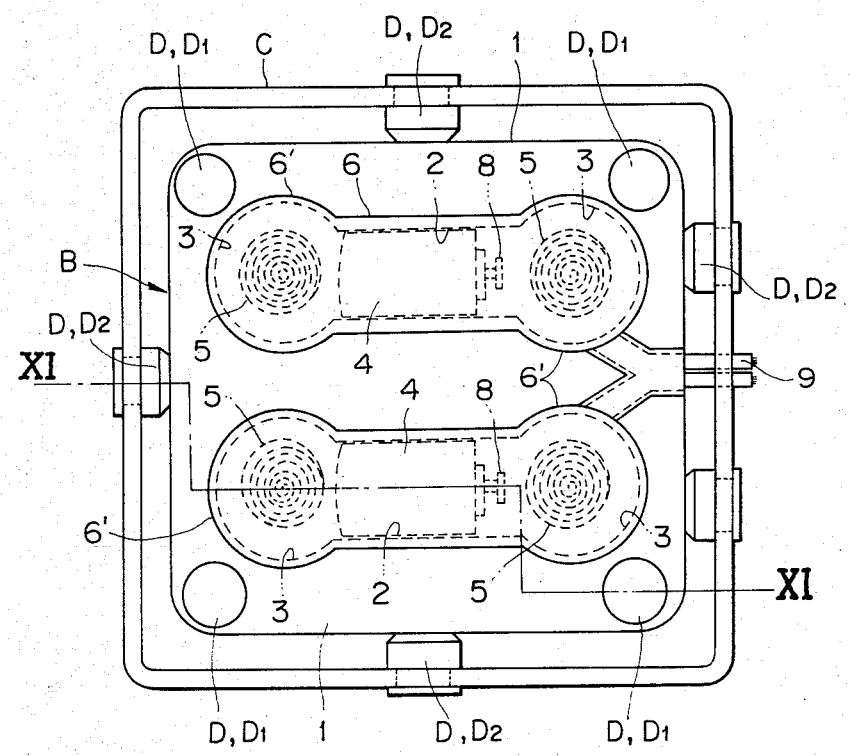
FIG. 10 is a front elevation view showing a massaging device incorporated in the vehicle seat of FIG. 9(a)
Figure 11:
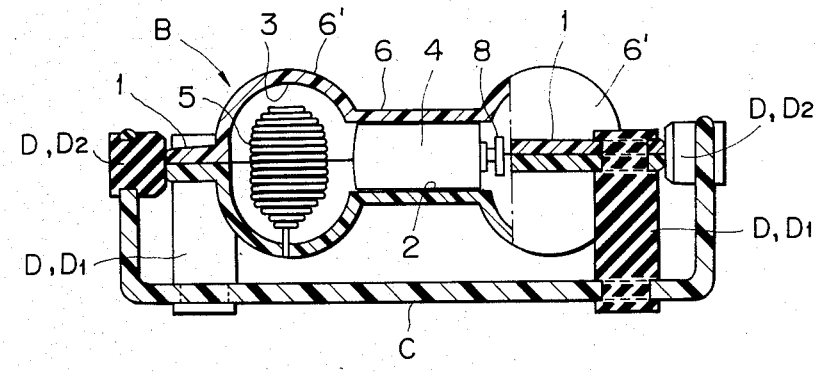
FIG. 11 is a sectional view taken along line XI—XI of FIG. 10.

Now, a third embodiment of a vehicle seat fitted with a massaging device according to the present invention will be described with reference to FIGS. 9 to 11.

In the third embodiment, a massaging device B is arranged in a casing C having a front open surface, with a suitable substantially vibration proof material D such as rubber, plastic foam or the like being interposed between a periphery of the massaging device B and an inner surface of the casing C. The casing C in which the massaging device B has been arranged is fixed on a suitable mounting structure E such as a frame or the like provided in a vehicle seat.

In the embodiment, an open-top rectangular box formed of a plastic material may be used for the third casing C. The casing C, as more detailedly shown in FIGS. 10 and 11, is provided at each of top corners thereof with a stud D1 formed of a suitable vibration proof material D such as rubber. Correspondingly, the massaging device B is formed at each of corners thereof with a through-hole. Mounting of the massaging device B in the casing C may be carried out by fitting the studs D1 of the casing C in the through-holes of the base 1 of the device B to hang it in the casing C. The casing C may be suitably provided with small projections D2 formed of a vibration proof material to support the case 1 of the device B therethrough in the casing.

Also, in the third embodiment, a suitable cushion material (not shown) such as plastic foam covers an outside of the casing C and is filled in a space between the casing C and the massaging device B.

The casing C in which the massaging device B is held through the vibration proof material D at a state of floating therein is securely mounted at a back surface thereof on a mounting structure E such as a frame or the like arranged in a back supporting section a2 of a vehicle seat.

As described above, the third embodiment is so constructed that the massaging device arranged in the casing through the vibration proof material is incorporated in the back supporting section of the vehicle seat. Such construction causes the vibration proof material to prevent vibration generated from the massaging device from being transmitted in rearward, vertical and lateral directions thereof, so that it may be concentratedly transmitted in only a forward direction of the massaging device with high efficiency so as to be exclusively used for massage of the human body. Thus, it will be noted that the third embodiment permits the vibration to be effectively used for the massage.

The embodiment of FIG. 7 described previously includes two coiled springs, whereas the third embodiment includes four coiled springs. In other words, the coiled spring is arranged in each of four spherical portions.

The remaining parts of the third embodiment may be constructed in substantially the same manner as that of FIG. 7.

In the present invention, the massaging device may be constructed to have suitable structure and configuration, although it is preferably small-sized. Also, any commercially available or specially manufactured vibrator, kneader or the like may be conveniently incorporated in the back supporting section of the vehicle seat. Alternatively, only an essential mechanism of the massaging device including the hollow cylindrical section and the like may be suitably incorporated in the seat.

Thus, it will be noted that in the present invention, it is merely required to incorporate the massaging means capable of exhibiting massage function in the portion of the back supporting section of the seat abutted against a part of the human body to be massage such as the waist or the like.

As can be seen from the foregoing, the vehicle seat of the present invention can be small-sized, light-weighted and readily manufactured at a low cost. Also, the present invention is applicable to all vehicles including a car, a sightseeing bus, a truck and the like for business and domestic uses.

While preferred embodiments of the invention have been described with a certain degree of particularity with reference to the drawings, obvious modifications and variations are possible in the light of the above teachings. It is therefore to be understood that, within the scope of the appended claims, the invention may be practiced otherwise than as specifically described.

What is claimed as new and desired to be secured by Letters Patent of the United States is:

1. A vehicle seat comprising:
   (a) a seat section having a working surface which, in use, supports a person;
   (b) a back support section having a working surface against which, in use, a person rests; and
   (c) a massaging device enclosed in one of said seat section and said back support section, said massaging device comprising:
      (i) a base extending in parallel to the adjacent one of said working surfaces;
      (ii) a hollow motor chamber formed in said base;
      (iii) a hollow spring chamber formed in said base;
      (iv) a motor arranged in said hollow motor chamber in said base; and
      (v) a coil spring having two ends arranged in said hollow spring chamber in said base, said coil spring being fixed at one end to an inner surface of said hollow spring chamber and being free at the other end, whereby, when said motor is rotated at a high speed to generate vibrations, the vibrations are transmitted to said coil spring, thereby generating resonant vibrator movement in said coil spring, and the resonant vibratory movement of said coil spring generates ultrasonic waves in the air in said hollow spring chamber.

2. A vehicle seat as recited in claim 1 wherein said massaging device is enclosed in said back support section.

3. A vehicle seat as recited in claim 1 wherein said hollow motor chamber comprises a hollow cylindrical section and two spherical portions arranged laterally with respect to said hollow cylindrical section.

4. A vehicle seat as recited in claim 1 wherein the interior of said hollow spring chamber and the interior of said hollow motor chamber are not in communication.

5. A vehicle seat as recited in claim 1 wherein the interior of said hollow spring chamber and the interior of said hollow motor chamber are in communication.

6. A vehicle seat as recited in claim 5 wherein:
(a) said hollow motor chamber is cylindrical in shape and
(b) said hollow spring chamber is spherical in shape.

7. A vehicle seat as recited in claim 1 wherein:
(a) said massaging device is arranged in a casing having a front opening facing the adjacent one of said working surfaces and
(b) a substantially vibration-proof material is interposed between said massaging device and said casing.

8. A vehicle seat as recited in claim 1 wherein at least two massaging devices as recited in claim 1 are enclosed in one of said sections.

* * * * *